United States Patent [19]

Brisebarre et al.

[11] 3,725,908

[45] Apr. 3, 1973

[54] IMPACT TRANSDUCER KEYBOARD APPARATUS

[75] Inventors: Marcel Brisebarre, Thoiry; Xavier de Saint Sauveur, Ferney-Voltaire, both of France

[73] Assignee: Control Data Corporation, Minneapolis, Minn.

[22] Filed: June 21, 1971

[21] Appl. No.: 156,146

[52] U.S. Cl...................340/365 A, 310/8.3, 200/181

[51] Int. Cl................................................H04q 3/00

[58] Field of Search...........340/365, 365 A; 200/181; 310/8.3

[56] References Cited

UNITED STATES PATENTS

| | | | |
|---|---|---|---|
| 3,353,038 | 11/1967 | Mason et al. | 340/365 X |
| 3,366,808 | 1/1968 | Steward | 340/365 X |
| 3,307,148 | 2/1967 | Fukamachi | 340/365 X |
| 3,546,619 | 12/1970 | Cragg et al. | 340/365 X |
| 3,586,888 | 6/1971 | Dorfman | 310/8.3 |

*Primary Examiner*—John W. Caldwell
*Assistant Examiner*—Robert J. Mooney
*Attorney*—Paul L. Sjoquist et al.

[57] ABSTRACT

A keyboard apparatus having a plurality of spring-mounted hammers actuated by the key mechanisms is disclosed, where the hammers contact piezoelectric crystals to generate electrical signals when keys are depressed.

6 Claims, 3 Drawing Figures

INVENTOR.
Marcel Brisebarre
Xavier de Saint Sauveur
BY Paul L. Sjoquist
ATTORNEY

IMPACT TRANSDUCER KEYBOARD APPARATUS

The coded alphanumeric keyboard, known for a long time as an essential part of the teletypewriter, has followed an important development during recent years in its application to the terminals of communication with a computer. A number of proposals have already been submitted on this subject on different kinds of keyboards.

The principle of such a keyboard consists of releasing a combination of coded signals for each key depression; this process produces some possibilities of ambiguities, such as those coming from an irregular setting up of the signals by bouncing or from the simultaneous pressure on two keys by an operator trained for high speed typing. This occurs when the key of the next character is depressed before the key of the previous one is released.

One remedies this first point by the proper coordination between the mechanical transmission of each key depression and the time constants of the encoding system. The second point brings up a number of problems; in the classical teletypewriter, the mechanical interlocking of the keys has been used, this has the disadvantage of producing a rough and disagreeable touch which is no longer desired by the users. Therefore, these users would prefer keyboards similar to the electric typewriter.

Clearing this ambiguity may be done at another level, but it should be considered that the generation of a signal can be made according to one of the two following solutions:

a. each key generates "physically" some codes which are then transformed into electrical signals;

b. each key generates an electrical signal which must correspond to a particular code.

In the case a), the codes are only some combinations of six to eight states to be transformed into electrical signals. This, at a first look, makes this solution more attractive than the solution b). This first solution includes some methods based, for instance, on the photoelectric effect or on combinations of capacitors. Their disadvantages can include a limited reliability, a disagreeable touch and the need for a mechanical interlock or a sophisticated dispositive. It is feasible to reach a good realization of this kind, but this one is expensive either in manufacturing or by the research needed before reaching a good result, so, it does not seem best to adopt such a solution.

In the case b), the generator using a simple electric contact either has a limited reliability or a high cost for an acceptable reliability. In addition, it does not solve well the problems of clearing ambiguities. If one looks at some advanced techniques of high reliability, such as those using Hall effect, the optoelectronic effect, and others, they have the disadvantage of producing only a low electrical level so that they must each be associated with an amplifier and possibly a trigger to feed the encoding logic. Because of these problems they are too expensive for the manufacturer of inexpensive keyboards. In addition, if they are generators of "level," this means translating the level of depression into an electric level, those techniques do not solve the problems of ambiguity in the best way.

The method using an individual electrical generation for each key and encoding by electronic logic are eased by the present invention in cost and technology of the electronic components; it has been necessary to find a kind of generator different from what has been proposed up to now and which satisfies the following conditions:

a. to be inexpensive enough to be used with each key;

b. to be of a high reliability;

c. to assume itself the functions of generation, of triggering and of amplification; and d. to be capable to solve in a satisfying way the various problems of ambiguity.

The present invention achieves such goals, by using a generator, although well known for a long time in multiple applications, does not seem up to now to have attracted the attention of the keyboard manufacturers, probably because the mechanical concept tied to the use of such a generator was not realizable.

The present invention has for its object a coded keyboard, of alphabetic and numeric type, notably for a terminal of communication with a computer, allowing the typing without error of codes by an operator working at the fastest typing speeds.

The coded keyboard according to the invention, which includes a number of keys, a means to produce an electrical signal for each key depression, and an electronic encoding of the produced electrical signal, is mainly characterized in that these means include, for each key of the keyboard, a piezoelectric element and a system to produce, at the time of depression of a key, an impact of fairly constant intensity on this element. The electrical pulse which is created by the impact is used by the encoding system.

According to another particular feature of the invention, the apparatus includes an elastic blade made of a magnetic material having one fixed end, a hammer mounted on the other end of the blade, the piezoelectric element being located on its trajectory, a magnet used to sustain the blade in idle position at its end where the hammer is mounted, and an oscillating lever at the end of which the key is mounted. At the time that the key is depressed the camber is positioned in the center of the elastic blade, and at a certain instant produces enough pressure to force the blade from its magnetic support, and the hammer is projected onto the piezoelectric element.

Preferably, the piezoelectric element is a solid flat cylinder made of lead titanate ceramic.

The attached drawing show, as a simple purpose of illustration, an example of construction of the keyboard according to the invention, in which.

Figure 1:
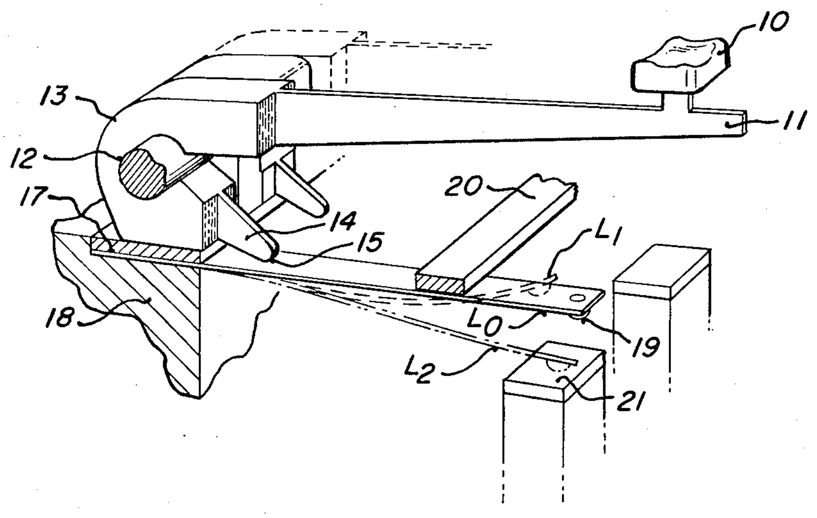
FIG. 1 is a partial keyboard view showing a piezoelectric generator with the intermediate mechanical parts used for connection with the corresponding key of the keyboard.

As shown in FIG. 1, and as known, each key 10 of the keyboard is mounted at the end of a lever 11 which can oscillate on an axis 12. This axis is common to the axis of the other keys by an elastomer material 13 on the edge of the keyboard. The key 10 is shown in its idle position, and after any depression, it recovers its original position by some means as described below.

According to the invention, the lever 11 is prolongated downward and in front of the axis, by an inclined "finger" 14, the end of which 15 is in contact with the elastic blade 16, made of a magnetic material, and about in the middle part of it. This blade has a fixed end 17 inside the support 18, which support also holds other elastic blades of the keyboard. The hammer 19 is mounted at the other end of the blade and a magnetic strip 20 is mounted above the blade 16 (and also above other blades) a little nearer to the center than the hammer 19. In its idle position shown by $L_o$, the blade is maintained by the attraction of the magnet and adheres to it. The piezoelectric detector 21 shown under the hammer produces a signal which must be processed after the impact is received.

The mechanical functioning of this apparatus is as follows:

If one presses on the key 10, the end 15 of the finger 14 exerts a downward force in the center of the blade 16. The blade 16 starts bending between its fixed end 17 and the support point held by the magnet 20. Because of this, the blade takes the position $L_1$ and when the force provided by the finger 14 exceeds the attractive force of the magnet, this support yields. At this time, the elastic blade which remains maintained by its fixed end 17 suddenly straightens itself out, and the hammer 19 is projected downward with a speed which only depends on the characteristics of the elasticity and of weight of the blade. While being impacted by the hammer (position $L_2$ of the blade), the piezoelectric element 21 transmits a signal to be processed, as will be shown in subsequent paragraphs.

As the key 10 is released, the elastic blade 16 comes back to its idle position $L_o$, lifting the finger 14. This also brings the key back to its idle position which remains defined by the return of the blade in contact with the magnet 20.

One must note that the definition of the position of the piezoelectric detector 21 on the downward trajectory of the hammer is such that because the hammer encounters the detector, a series of spurious self oscillations of the elastic blade, which are of relatively high amplitude and of relatively long periodicity and damping, are eliminated.

In addition, the touch is of a particularly functional nature, since it consists in a progressively increasing effort, followed by a sudden increase at the instant of the release of the blade. As a consequence, the operator feels effectively the typing of the character and can limit travel and effort accordingly.

The inexpensive embodiment described above meets the following requirements: it may be constructed in such a way that one can provoke only one release as long as the key has not come back to its idle position; between a very slow progressive depression and an actual impact on the key, the kinetic energy communicated to the hammer is always inside fixed limits such that the electrical response of the piezoelectric element is only variable inside an acceptable range; the slowest key action at a speed of depression practically insignificant gives a usable minimum of electrical response.

In addition, this kind of generator, combined with the diode encoding system which is described below and depicted in FIG. 2, meets the necessary conditions of electrical response in allowing to clear the possible ambiguities as will be explained.

Figure 2:
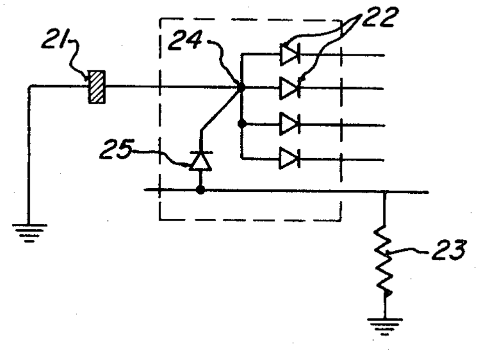
FIG. 2 is a schematic of the electronic encoding of a signal produced by the piezoelectric element.

As shown in FIG. 2, the piezoelectric element 21 is connected at a point 24 to a set of coding diodes 22. It is also connected through an inverted diode 25 to a recovery impedance 23 which is relatively large (a few hundreds of K) which is common for all the keys. The discrete diodes shown can be replaced by standard integrated elements.

It has been shown that the potential energy of bending of the elastic blade is transformed into kinetic energy at the time of release. It is retransformed into a pulse of energy of extremely short duration at the instant of the impact. This last pulse is finally translated by the piezoelectric element 21, with its own efficiency, into an electric pulse having a voltage in the range of 1 V, a duration of 2 to 5 microseconds and a rising front of about 500 nanoseconds. Such a pulse is enough to feed a coding system as described in FIG. 2.

Figure 3:
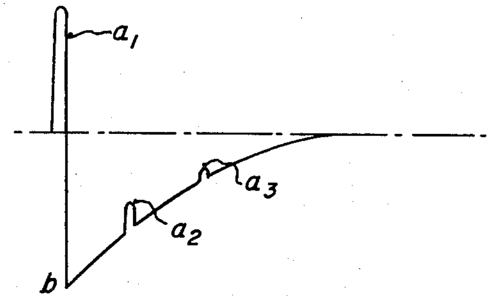
FIG. 3 is a diagram of the successive pulses of impact and bounces after depressing a typical key.

The possible ambiguity coming from some small bounces of the hammer 19 on the impacted surface will be inhibited in the manner now described. These bounces have a periodicity in the range of milliseconds and are not repeated more than twice or three times. But, after the initial impact, the piezoelectric element tends to recover its initial physical state by producing an inverted voltage as shown in FIG. 3. This inverted voltage does not find the diodes 22 in their conducting direction, as for the useful pulse, but it finds these diodes in the non-conducting direction. The piezoelectric element can only recover with a long time constant, which would be its own time constant if the diodes were perfect and without any other parallel impedance. That is to say that this inverted voltage has a high amplitude and can only come slowly back to zero. By giving some by-passing capability with diode 25 and resistor 23 in this direction, the amplitude and time constant are limited to practical values.

From this slow inverted recovery, the small pulses tending to the forward direction, corresponding to the possible bounces of the hammer 19, have to rise from the high inverted level of recovery at this time and cannot reach the forward conduction operating level on the coding diodes. All this process is shown by the diagram FIG. 3 where one can see in $a_1$, the amplitude of the initial impact; in $b$, the level of the inverted voltage of the piezoelectric element; and in $a_2$ and $a_3$, the amplitudes of bounces.

So, the piezoelectric element allows replacement by itself the functions of the generator, of the trigger and of the amplification which are necessary in some other systems.

The ambiguity coming from the simultaneous depression of several keys is also solved efficiently by this short pulse generator.

A key held depressed for any length of time does not have any effect after it has impacted its own detector, and other key depressions can be made while this key is still held in the low position. As soon as the voltage pulse generation has reached the operating level, in about 500 nanoseconds, one can see that any other voltage pulse generation released after these 500 nanoseconds does not risk the mixing of other code components which would produce a false code. This condition is enough, taking account of the speeds of human action on a keyboard, to remove the need for a key interlock.

Therefore, one must consider that if a previous code signal has not been accepted with the same speed by the user equipment, the following code is not usable. One can remedy this in two possible ways, to be described hereinafter.

One can avoid the losing of a current code signal by interrupting the output of any other following code signal if the following signal generation is made before the user equipment has acknowledged the previous generation. The operator must manually check on which character of the transfer has been interrupted and must restart at the correct position. This solution is only acceptable if the user equipment normally answers faster than the fastest normal typing.

In the alternative one can use, either in the keyboard or in the user equipment, an intermediate register which makes the code signal transfer almost instantaneously free.

Obviously, the invention requires for the piezoelectric element the selection of appropriate material. The material selected is a ceramic, and especially the selection of the lead titanate gives the advantage of a signal level high enough to feed the coding system and even the output register in the most direct manner possible. It is more expensive than barium titanate, but this one needs more amplification after encoding. The element can be used in its self-oscillation frequency. This significantly decreases its cost. Each element has the shape of a small flat cylinder with a diameter of about 5 millimeters and a thickness in the range of 1 millimeter.

What is claimed is:

1. Keyboard apparatus comprising: support means; a resilient spring member having an end portion secured to said support means, said spring member being cantilevered for movement in a plane between first and second positions; actuating means in physical contact with a midpoint of said spring member for urging said spring member between said first and second positions upon physical displacement of said actuating means; hammer means connected to said spring member at a location remote from said support means; a piezoelectric element mounted in relationship to said spring member as to be spaced from said hammer means when said spring member is in its first position and to be struck by said hammer means when said spring member moves from its first position to its second position, said piezoelectric element being adapted to generate an electric signal upon being struck by said hammer means; and latching means associated with said spring member for restraining movement of said spring member from its first position to its second position, said latching means including a magnet member magnetically coupling a region of said spring member so that when the energy stored in said spring member resulting from the urging of said spring member towards its second position exceeds a design level, said latching means releases said spring member so that the energy stored in said spring member causes said spring member to move towards its second position to cause said hammer means to strike said piezoelectric element.

2. Apparatus according to claim 1 further including electric circuit means connected to said piezoelectric element to receive said generated electric signal, said circuit means including unidirectional conductive means for passing said generated electric signals having a first polarity and for inhibiting passage of said generated electric signals having a second polarity opposite from said first polarity.

3. Apparatus according to claim 2 wherein said circuit means further includes second unidirectional conductive means for passing said generated electric signals having said second polarity, and a load impedance connected to said second unidirectional conductive means for dissipating electric signals having said second polarity.

4. Apparatus according to claim 1 wherein said actuating means comprises a key-operable lever arm pivotly rotatable about an axis disposed substantially perpendicular to said plane in which said spring member is moveable, and a cam member connected to said lever arm and having a cam surface in physical contact with said midpoint of said spring member, said cam member urging said spring member between said first and second positions upon pivotal rotation of said lever arm.

5. Keyboard apparatus having a support and having a plurality of keys and a like plurality of signal generating elements, each responsive to the physical movement of individual ones of said keys, each signal generating element comprising: a resilient spring member having an end portion secured to said support, said spring member being cantilevered for movement in a plane between first and second positions; actuating means in physical contact with a midpoint of said spring member for urging said spring member between said first and second positions upon physical displacement of said actuating means; hammer means connected to said spring member at a location remote from said support; a piezoelectric element mounted in relationship to said spring member as to be spaced from said hammer means when said spring member is in its first position and to be struck by said hammer means when said spring member moves from its first position to its second position, said piezoelectric element being adapted to generate an electric signal upon being struck by said hammer means; latching means associated with said spring member for restraining movement of said spring member from its first position to its second position, said latching means including a magnet member magnetically coupling a region of said spring member so that when the energy stored in said spring member resulting from the urging of said spring member towards its second position exceeds a design level, said latching means releases said spring member so that the energy stored in said spring member causes said spring member to move towards its second position to cause said hammer means to strike said piezoelectric element; and electric circuit means connected to said piezoelectric element to receive said generated electric signal, said circuit means including unidirectional conductive means for passing said generated electric signals having a first polarity and for inhibiting passage of said generated electric signals having a second polarity opposite from said first polarity.

6. Apparatus according to claim 5 further including second unidirectional conductive means connected to all of said piezoelectric elements for passing generated electric signals having said second polarity, and a load impedance connected to said second unidirectional conductive means for dissipating electric signals having said second polarity.

* * * * *